United States Patent [19]

Chen

[11] Patent Number: 5,207,118
[45] Date of Patent: May 4, 1993

[54] PEDAL SHAFT CORE

[76] Inventor: Chia-Ching Chen, 307, Chieh-Shou Village, Changhau City, Taiwan

[21] Appl. No.: 763,244

[22] Filed: Sep. 20, 1991

[51] Int. Cl.[5] .............................................. G05G 1/14
[52] U.S. Cl. ................................. 74/594.1; 74/594.4; 384/474; 384/558
[58] Field of Search ...... 74/594.2, 594.1, 594.4–594.6; 384/571, 558, 589, 474, 458, 698

[56] References Cited

U.S. PATENT DOCUMENTS

| | | | |
|---|---|---|---|
| 747,895 | 12/1903 | Schumacher | 384/589 |
| 2,659,637 | 11/1953 | Barr | 384/558 |
| 2,990,223 | 6/1961 | Best | 384/571 |
| 3,937,539 | 2/1976 | Jones et al. | 384/571 |
| 4,010,987 | 3/1977 | Jasperse et al. | 384/474 |
| 4,129,343 | 12/1978 | Janssen | 384/558 |
| 4,172,620 | 10/1979 | Marti | 384/474 |
| 4,883,368 | 11/1989 | Stein | 74/594.1 |
| 5,024,121 | 6/1991 | Hsieh | 74/594.1 |

FOREIGN PATENT DOCUMENTS

| | | | |
|---|---|---|---|
| 0158682 | 7/1903 | Austria | 74/594.1 |
| 0429243 | 5/1935 | United Kingdom | 384/458 |

Primary Examiner—Richard E. Chilcot, Jr.
Assistant Examiner—Winnie Yip
Attorney, Agent, or Firm—Larson and Taylor

[57] ABSTRACT

An improved pedal shaft core is characterized in that the contact surfaces of both shaft core and shaft bearing are designed to be oblique and conical to enable the bearing to comprise roller nest bearing and a casing of circular and conical arc so as to enhance the rotational stability of the pedal shaft core. The toothed cup of the shaft core comprises grease filling apparatus of an inclined type located on the external surface of one end thereof. The improved pedal shaft core further comprises of a pair of W-shaped non-return washers of waterproof and oil-proof nature.

3 Claims, 3 Drawing Sheets

PEDAL SHAFT CORE

BACKGROUND OF THE INVENTION

The present invention relates to a shaft, and more particularly to a pedal shaft core designed with improved structures.

As shown in FIG. 1, a conventional pedal shaft core of the prior art is constructed in such a manner that the shaft core is substantially perpendicular to the contact surface of the shaft and that it is of a ball bearing type. As a result, the pedal shaft core of the prior art is inherently defective in that it cannot be locked securely and in that it cannot be stabilized easily during the rotation thereof. In addition, the pedal shaft core of the prior art comprises the grease filling ports located at the bottom portion of the casing thereof. Thus the task of assembling a pedal shaft core of the prior art is extremely tedious, because each of the inner holes of the grease filling ports must be arranged in alignment with each of the shaft holes located in the interior of the shaft. Furthermore, the pedal shaft core of the prior art must be placed in an inclined position or in an upside down position in order to permit the user thereof to inject the grease thereinto, because all grease filling ports are located at the bottom of the shaft core.

SUMMARY OF THE INVENTION

It is therefore the primary objective of the present invention to provide a pedal shaft core with improved structures permitting the shaft core to be locked securely after prolong usage thereof.

It is an other primary objective of the present invention to provide a pedal shaft core with improved structures ensuring the rotational stability thereof.

It is still another objective of the present invention to provide a pedal shaft core with improved structures which facilitates the task of filling the grease into the shaft.

In keeping with principles of the present invention, the primary objective of the present invention are accomplished by an improved shaft core characterized in that the contact surfaces of both shaft core and shaft bearing are designed to be oblique and conical to enable the bearing to comprise a roller nest bearing and a casing of circular and conical arc so as to enhance the stability of the shaft core. In addition, the toothed cup of the shaft core comprises an grease filling apparatus of an inclined type located on the external surface thereof. The improved shaft core is further composed of a pair of W-shaped dual non-return washers of waterproof and oil-proof nature.

BRIEF DESCRIPTION OF THE DRAWINGS

FIG. 2A is an enlarged cross-section of the washer 61 of FIG. 2.

DETAILED DESCRIPTION OF THE PREFERRED EMBODIMENT

Figure 1:
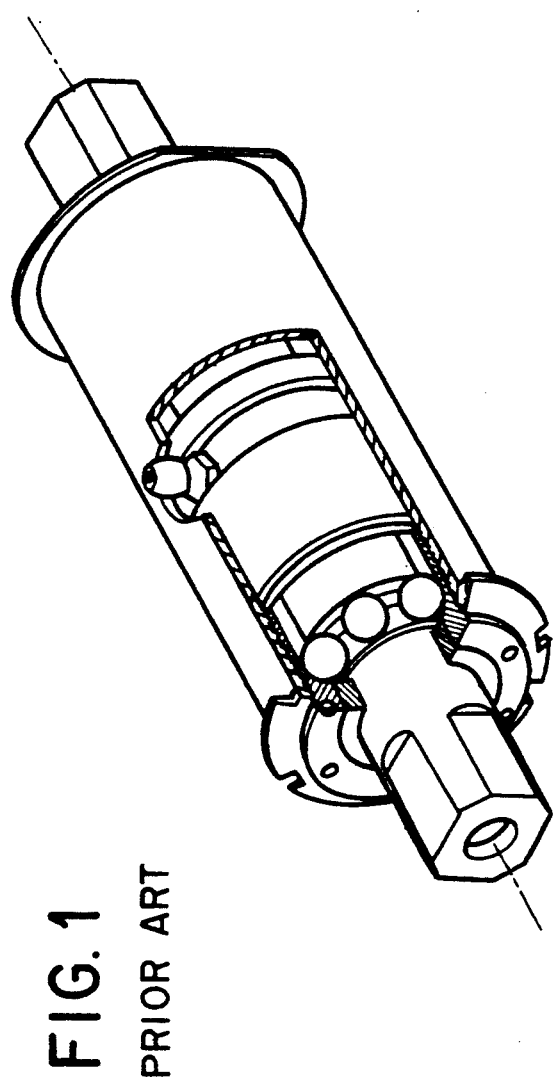
FIG. 1 shows a three-dimensional and sectional view of a pedal shaft core of prior art.
Figure 2:
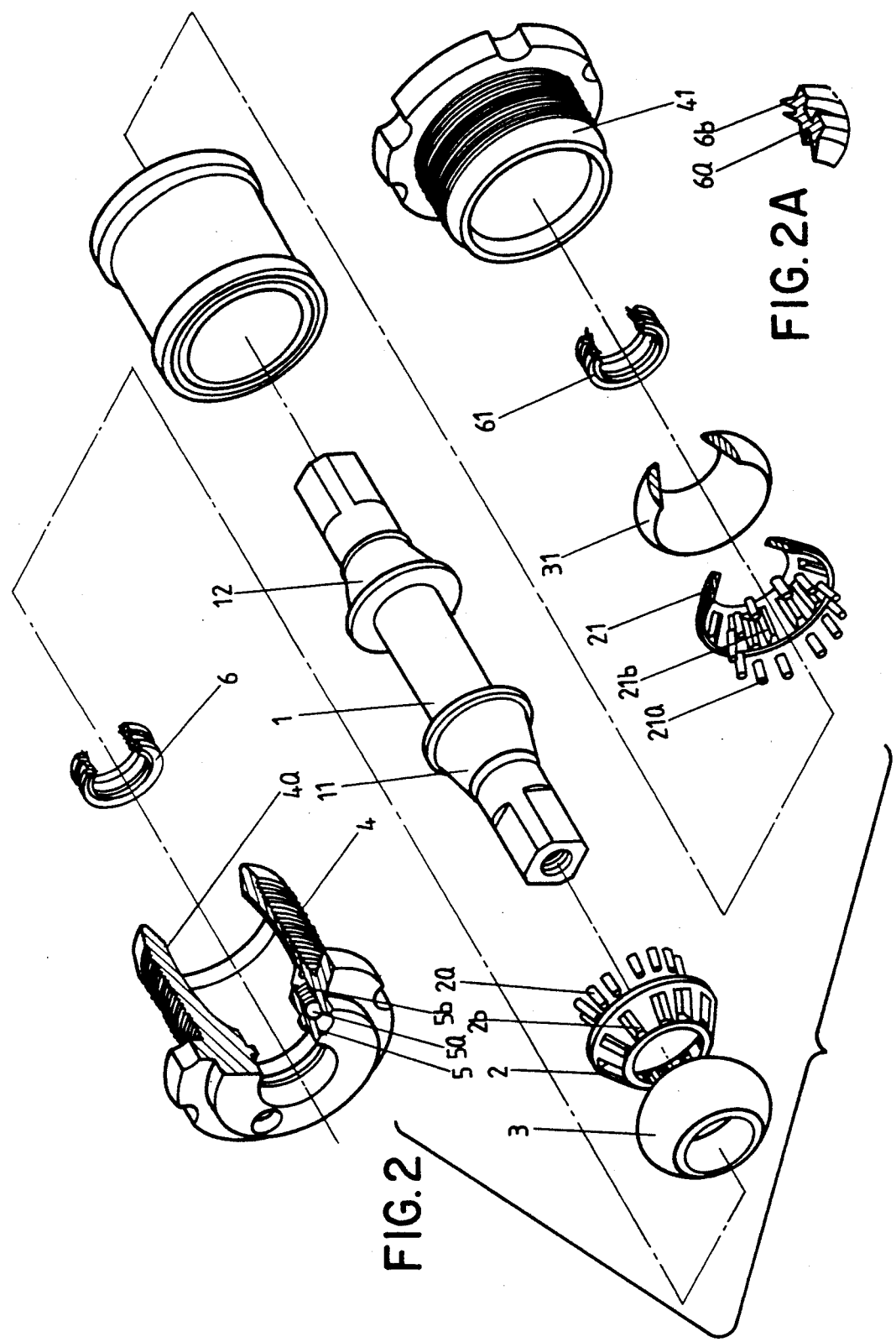
FIG. 2 shows an exploded view of the preferred embodiment of the present invention.

Referring to FIG. 2, the preferred embodiment of the present invention is shown comprising two oblique and conical surfaces 11 and 12, which serve as the contact surfaces between the shaft core 1 and the shaft bearing. In accordance with the inclination of the two oblique and conical surfaces 11 and 12, the shaft bearings are provided with two roller nests 2 and 21 of oblique and conical construction, which consist of slots 2b and 21b. Rollers 2a and 21a are lodged respectively in the slots 2b and 21b. The pedal shaft core of the present invention further comprises two casings 3 and 31 of circular conical art construction in such a manner that the roller nests 2 and 21 are positioned in the interior of casings 3 and 31. The structural design as such eliminates the use of ball bearing of prior art. The toothed cups 4 and 41 comprise respectively circular cambered portions 4a and 41a. Located on the external surface of the toothed bowl 4 is an inclined grease filling apparatus 5, which communicates with the circular cambered portion 4a and comprises therein a steel ball 5a and a spring 5b. Two W-shaped non-return washers 6 and 61 are arranged respectively in the spaces located between the toothed cups 4 and 41 and the roller nests 2 and 21 in order to avert the leakage of grease and to prevent the water from entering the roller nest bearings.

Figure 3:
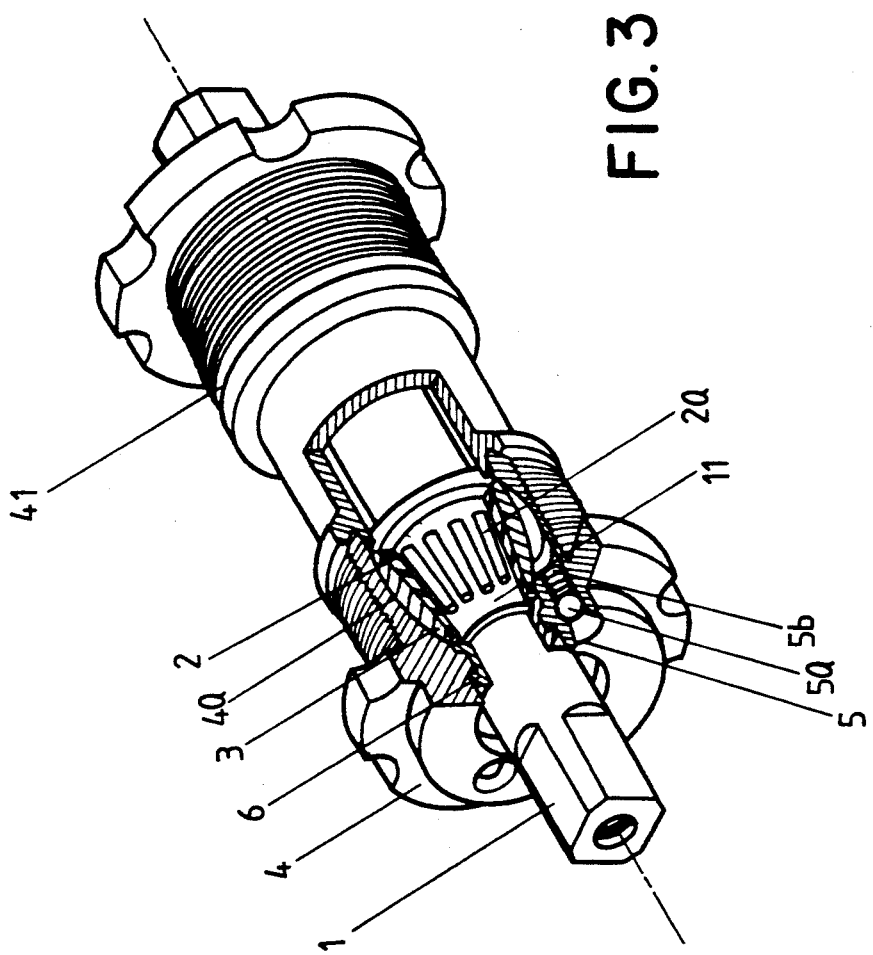
FIG. 3 shows a sectional view of the assembled pedal shaft core of the present invention.

Now referring to FIG. 3, the preferred embodiment of the present invention is shown comprising no ball bearings of prior art, which have been replaced in the present invention by the contact surfaces 11 and 12 of oblique and conical construction so as to ensure a greater stability of the pedal shaft core of the present invention. The rotational stability of the pedal shaft core of the present invention is further enhanced by the roller nest casings 3 and 31 of circular conical arc construction, which are capable of correcting any eccentric mass, thereby resulting in a greater impact resistance and abrasion resistance thereof and in a longer service lift thereof.

The toothed cup 4 comprises a grease filling apparatus 5, which is located at the end portion thereof and communicates with circular cambered portion 4a. Therefore, the operator can inject the grease easily into the grease filling apparatus 5 without having to put the shaft core in an inclined position or an upside down position. The injected grease is capable of flowing into the interior of the shaft by virtue of the presence of steel ball 5a and the expansion and the compression action of the spring 5b.

The embodiment of the present invention described above is to be considered in all respects as merely an illustration of principles of the present invention. Accordingly, the present invention is to be limited only by the scope of the hereinafter appended claims.

What I claim is:

1. An improved pedal shaft core comprising:
   a shaft core having a pair of opposed conical contact surfaces which taper inwardly in an axial direction towards two outer ends of the shaft core,
   a conical shaft bearing surrounding each conical contact surface and having slots therein, and rollers positioned in said slots so as to contact their respective contact surfaces,
   a casing having an interior shape surrounding each shaft bearing and contacting the rollers therein, each said casing having an exterior surface which is of circular, conical arcuate shape, viewed in an axial plane,
   a toothed cup having an interior camber located immediately outside of each said casing, an oil and waterproof washer inside said camber for sealing the space between the outer end of each casing and the outer end of the shaft core passing therethrough, and a grease filling port located at an axial end of at least one of said toothed cups for filling an interior of the shaft core with grease.

2. An improved pedal shaft core according to claim 1, wherein the grease filling port communicates with the circular conical arcuate outer surface of a casing.

3. An improved pedal shaft core according to claim 2, wherein the washer is W-shaped.

* * * * *